Dec. 2, 1958          N. A. NELSON          2,862,347
                       BALER STRUCTURE
Filed April 26, 1955                    14 Sheets-Sheet 2

INVENTOR.
NORAL A. NELSON
BY
ATTORNEYS.

Dec. 2, 1958   N. A. NELSON   2,862,347
BALER STRUCTURE
Filed April 26, 1955   14 Sheets-Sheet 4

INVENTOR.
NORAL A. NELSON
BY
ATTORNEYS.

Dec. 2, 1958 N. A. NELSON 2,862,347
BALER STRUCTURE
Filed April 26, 1955 14 Sheets-Sheet 5

INVENTOR.
NORAL A. NELSON
BY
ATTORNEYS.

INVENTOR.
NORAL A. NELSON

INVENTOR.
NORAL A. NELSON
BY
ATTORNEYS.

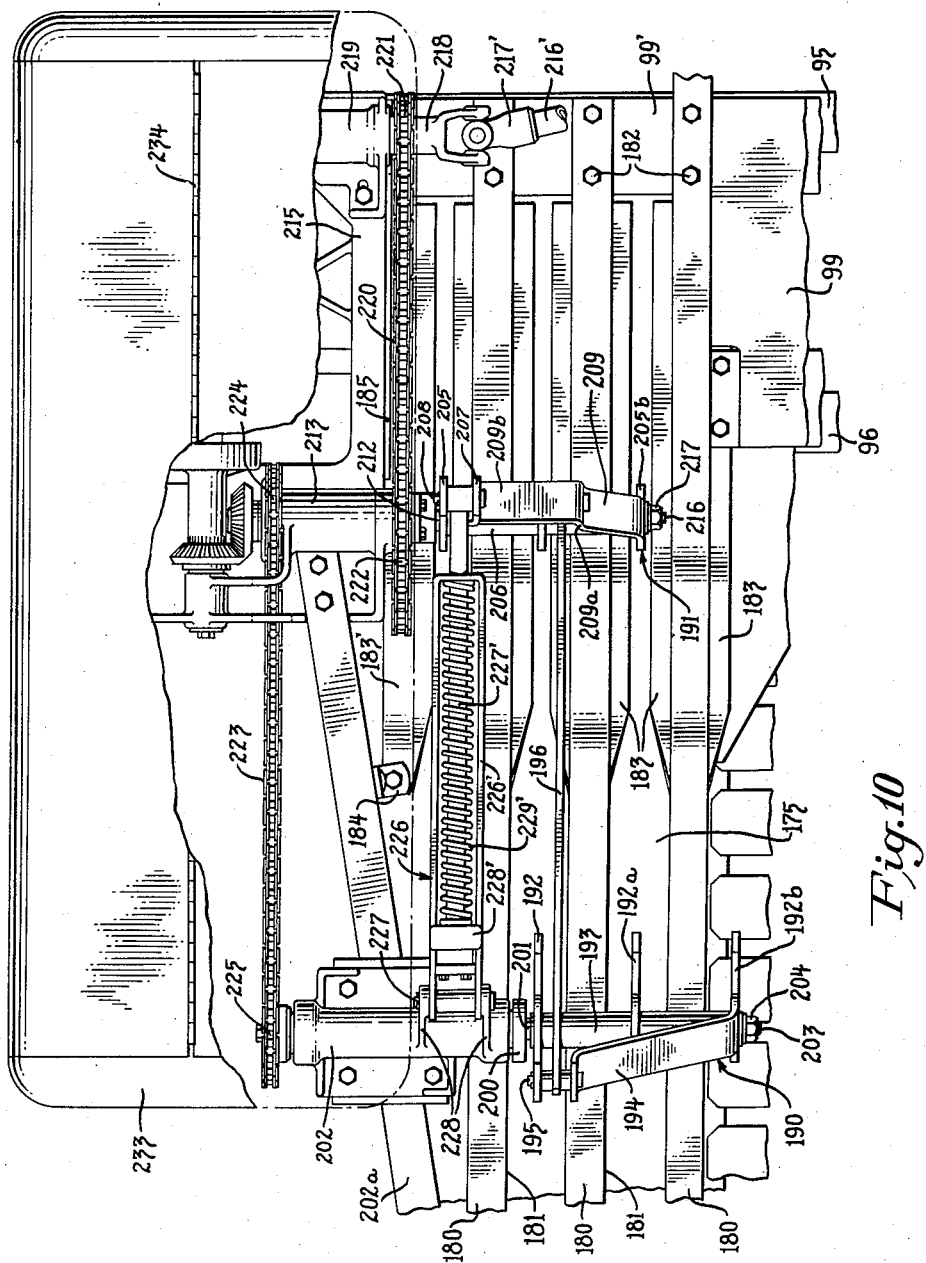

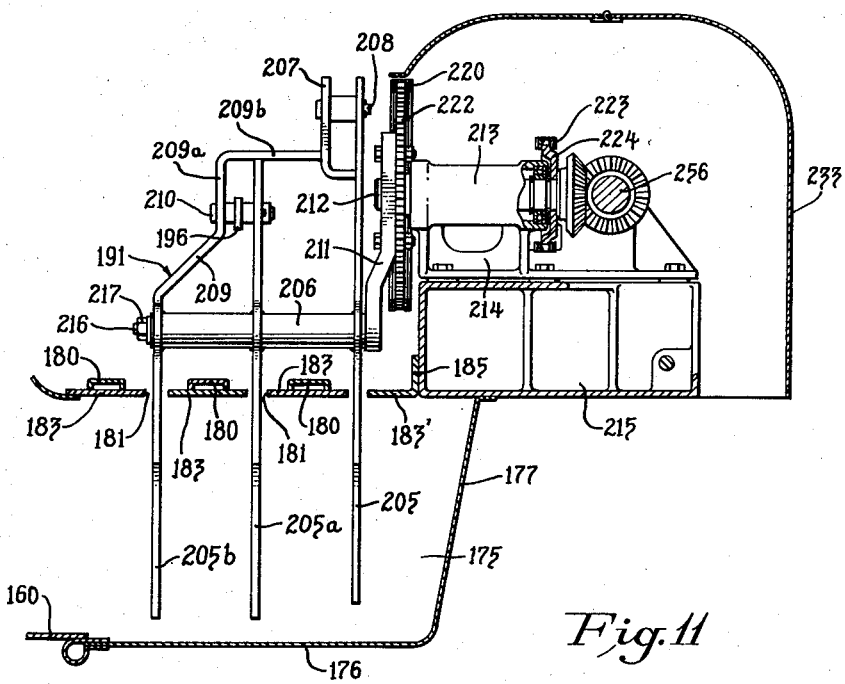
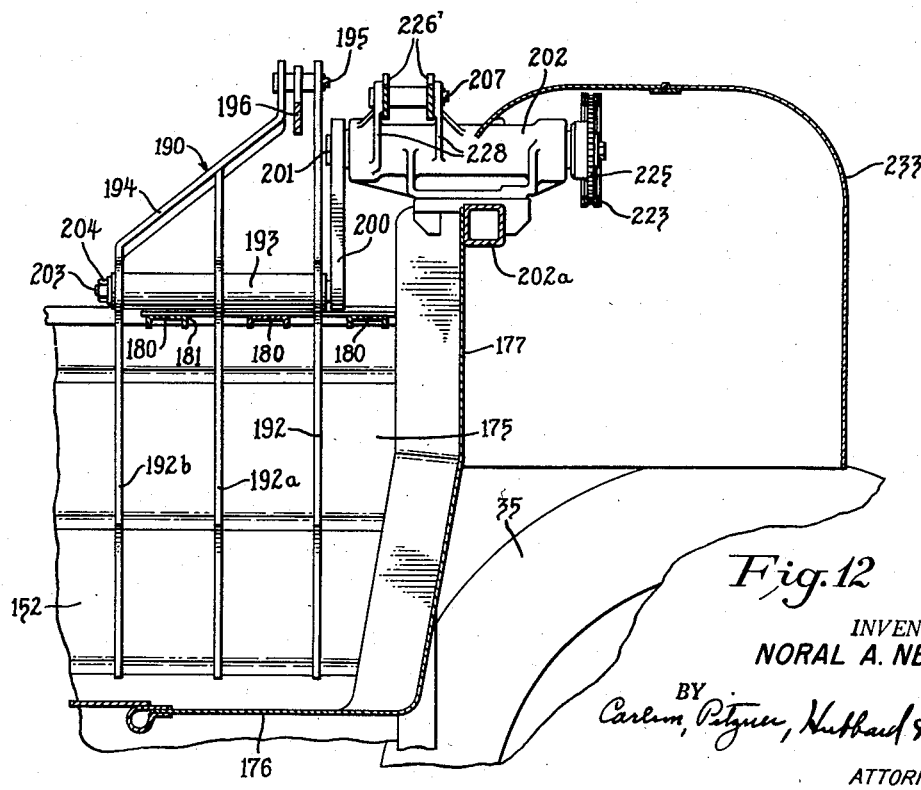

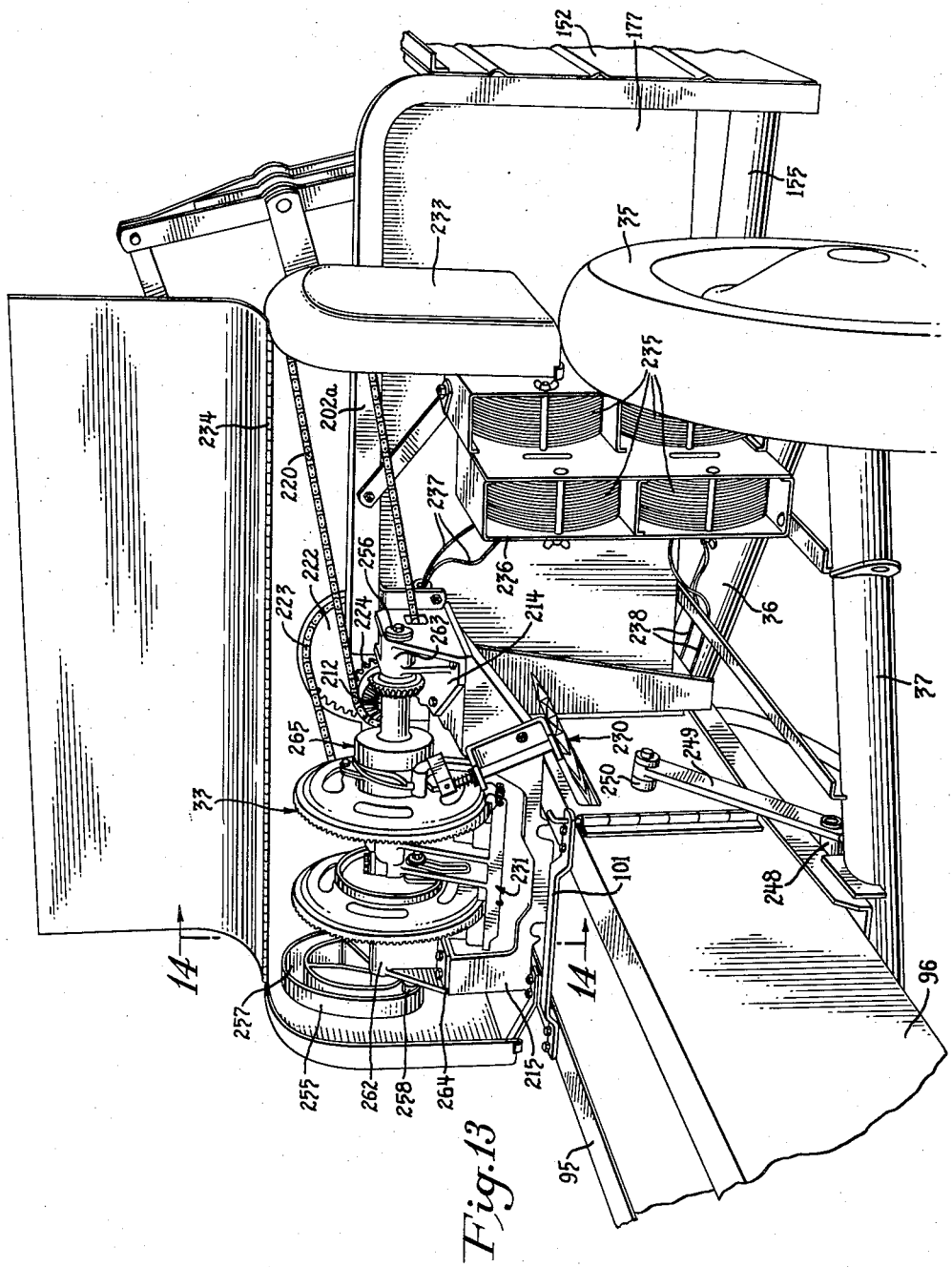
Dec. 2, 1958   N. A. NELSON   2,862,347
BALER STRUCTURE
Filed April 26, 1955   14 Sheets-Sheet 11
INVENTOR.
NORAL A. NELSON
BY
ATTORNEYS.

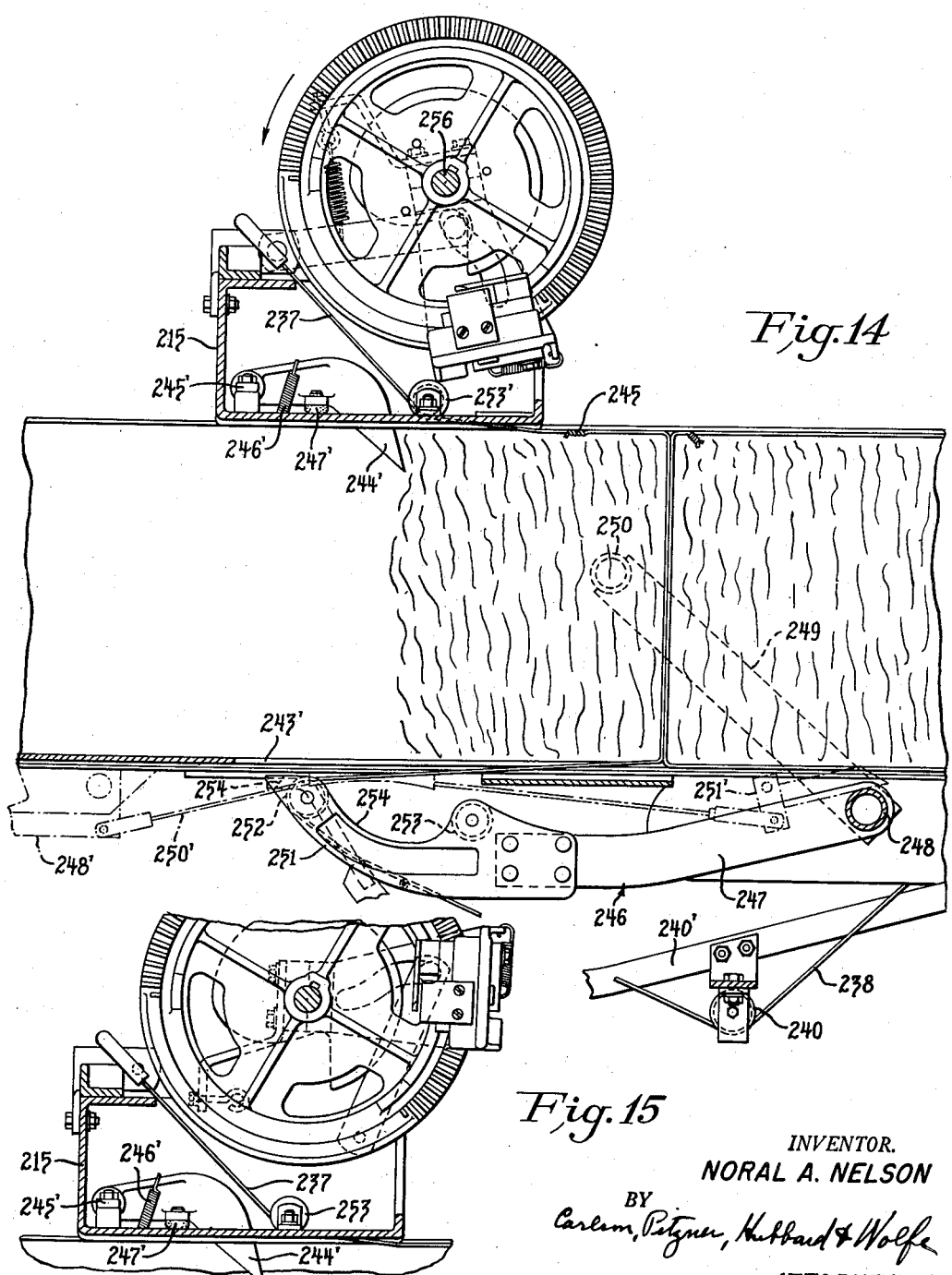

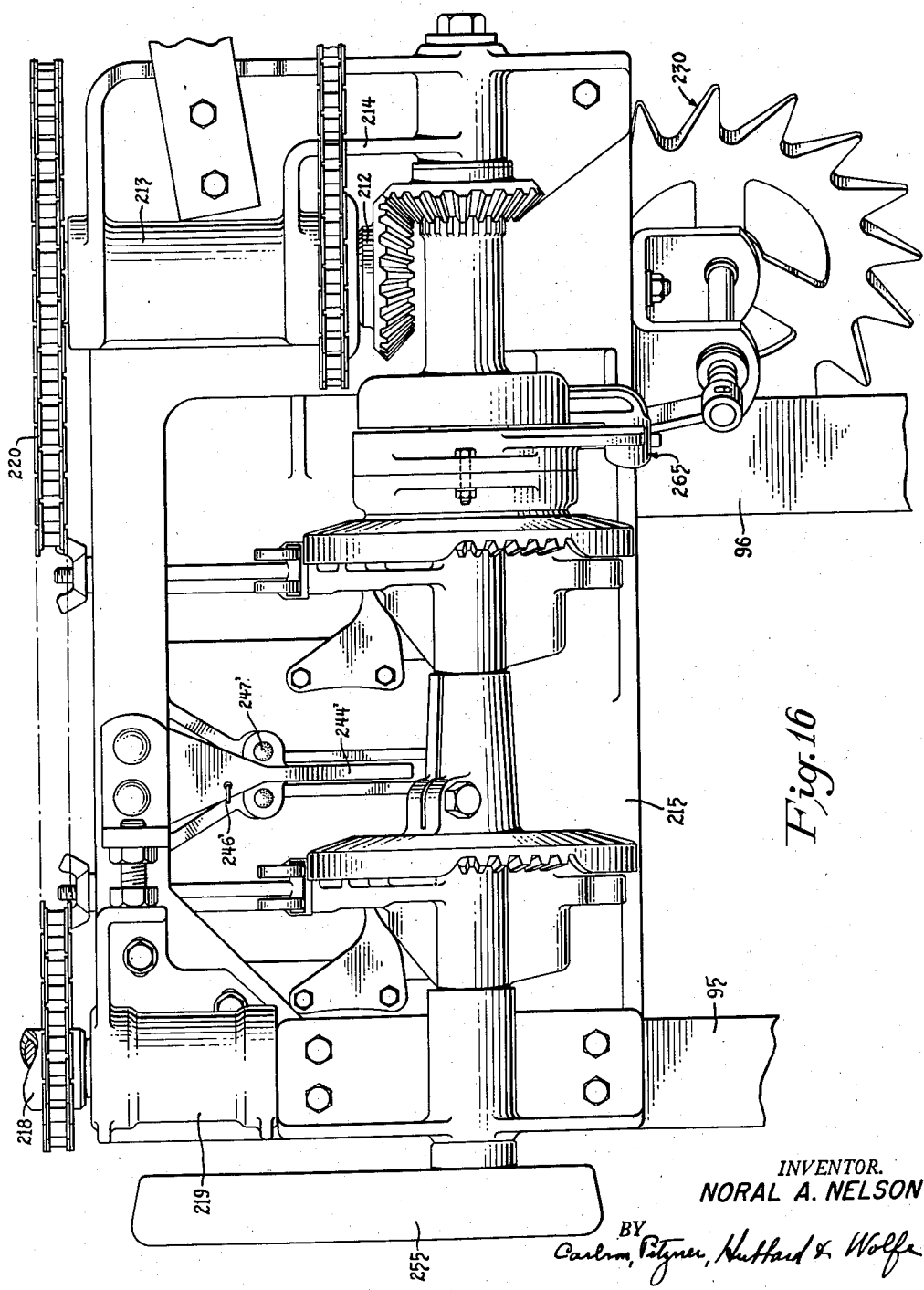

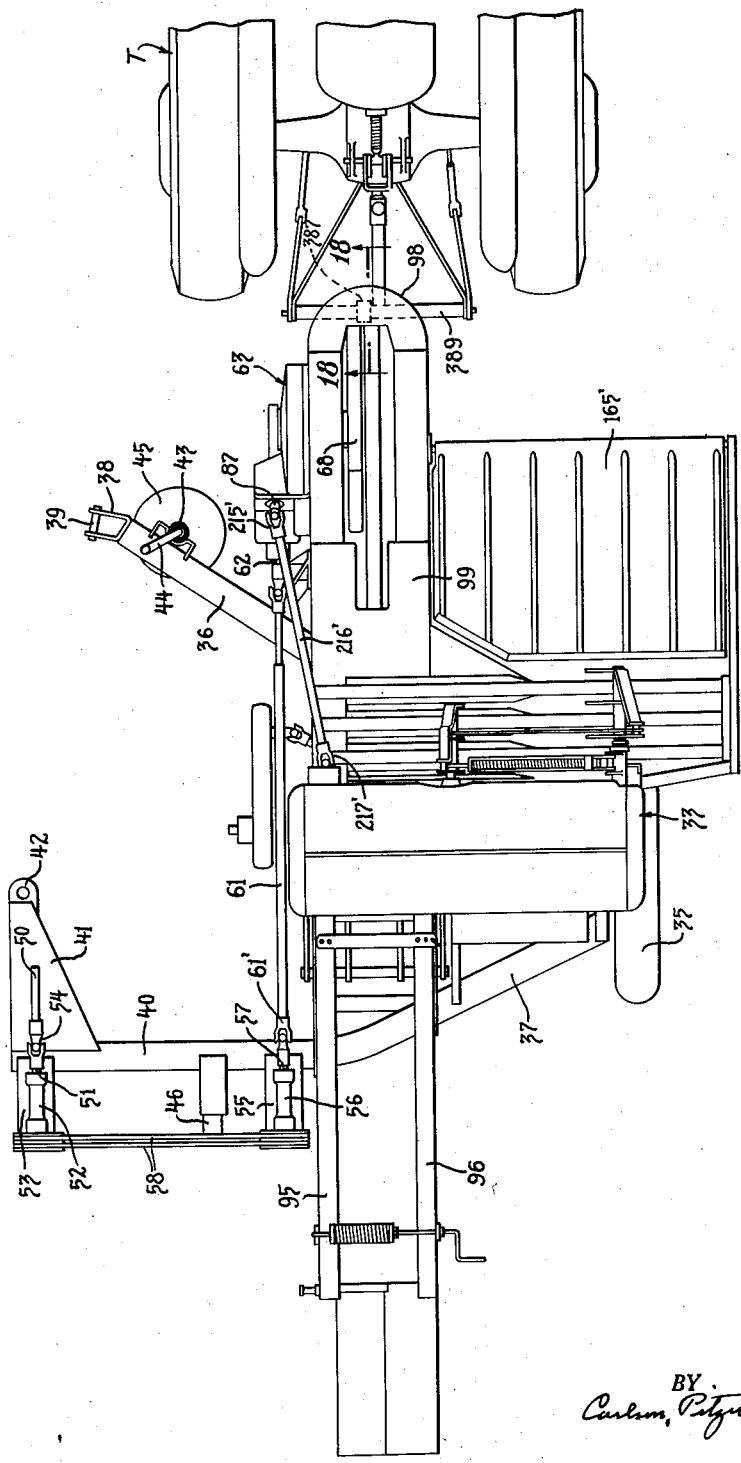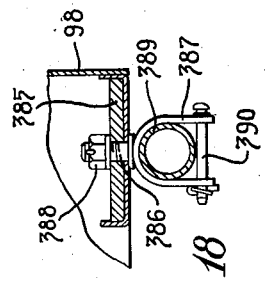

United States Patent Office 2,862,347
Patented Dec. 2, 1958

2,862,347

BALER STRUCTURE

Noral A. Nelson, Holland, Mich., assignor to Massey-Ferguson Inc., a corporation of Maryland Application April 26, 1955, Serial No. 504,080

12 Claims. (Cl. 56—341)

The invention relates to machines for baling hay, straw and comparable crop materials, and more particularly to pickup type or field balers.

One object of the invention is to provide a baler of the above general character adapted to be mounted on a tractor in a novel manner which simplifies attachment and detachment of the implement and facilitates operation of the tractor-implement combination.

Another object is to improve the operating efficiency of the mechanism for picking up the material to be baled and particularly the action of the pickup reel.

Another object is to provide a simpler and more efficient mechanism for transferring the material gathered by the pickup mechanism to the bale forming mechanism.

Still another object is to provide improved means for driving the baler from the power take-off shaft of the tractor upon which it is mounted, which means is readily adaptable for driving from an auxiliary engine.

It is also an object of the invention to provide an improved hitch by which the baler may be easily taken through narrow gates or passages.

Other objects and advantages of the invention will become apparent from the following detailed description of the preferred embodiment illustrated in the accompanying drawings in which Figure 1 is a perspective view of a pickup baler embodying the features of the invention, the baler being shown coupled to a tractor.

Fig. 10 is a fragmentary top view of the transfer mechanism of Fig. 9.

Fig. 11 is a fragmentary sectional view taken in a plane substantially on the line 11—11 of Fig. 9.

Fig. 12 is a fragmentary sectional view taken in a plane substantially on the line 12—12 of Fig. 9.

Fig. 13 is an enlarged fragmentary perspective view of the baler as seen from the rear with the housing cover raised to show details of the bale tying mechanism.

Fig. 14 is an enlarged fragmentary sectional view taken longitudinally of the baling chamber in a vertical plane substantially on the line 14—14 of Fig. 13.

Fig. 15 is a fragmentary sectional view similar to Fig. 14 showing the wire twisting mechanism in retracted position.

Fig. 16 is an enlarged fragmentary top view of the tying mechanism showing a twine knotter installed in place of the wire twister.

Fig. 17 is a plan view of the baler showing the manner of coupling it to a tractor for transport through narrow gates or passages.

Fig. 18 is an enlarged fragmentary sectional view taken in a plane substantially on the line 18—18 of Fig. 17.

For purposes of illustration a single preferred embodiment of the invention has been shown and will be described herein in some detail. It is to be understood, however, that it is not intended that the detailed character of the disclosure should limit the invention to such particulars. On the contrary, it is intended to cover all equivalents and alternative arrangements falling within the spirit and scope of the invention as it is more broadly and generally characterized in the appended claims.

General organization

Figure 1:
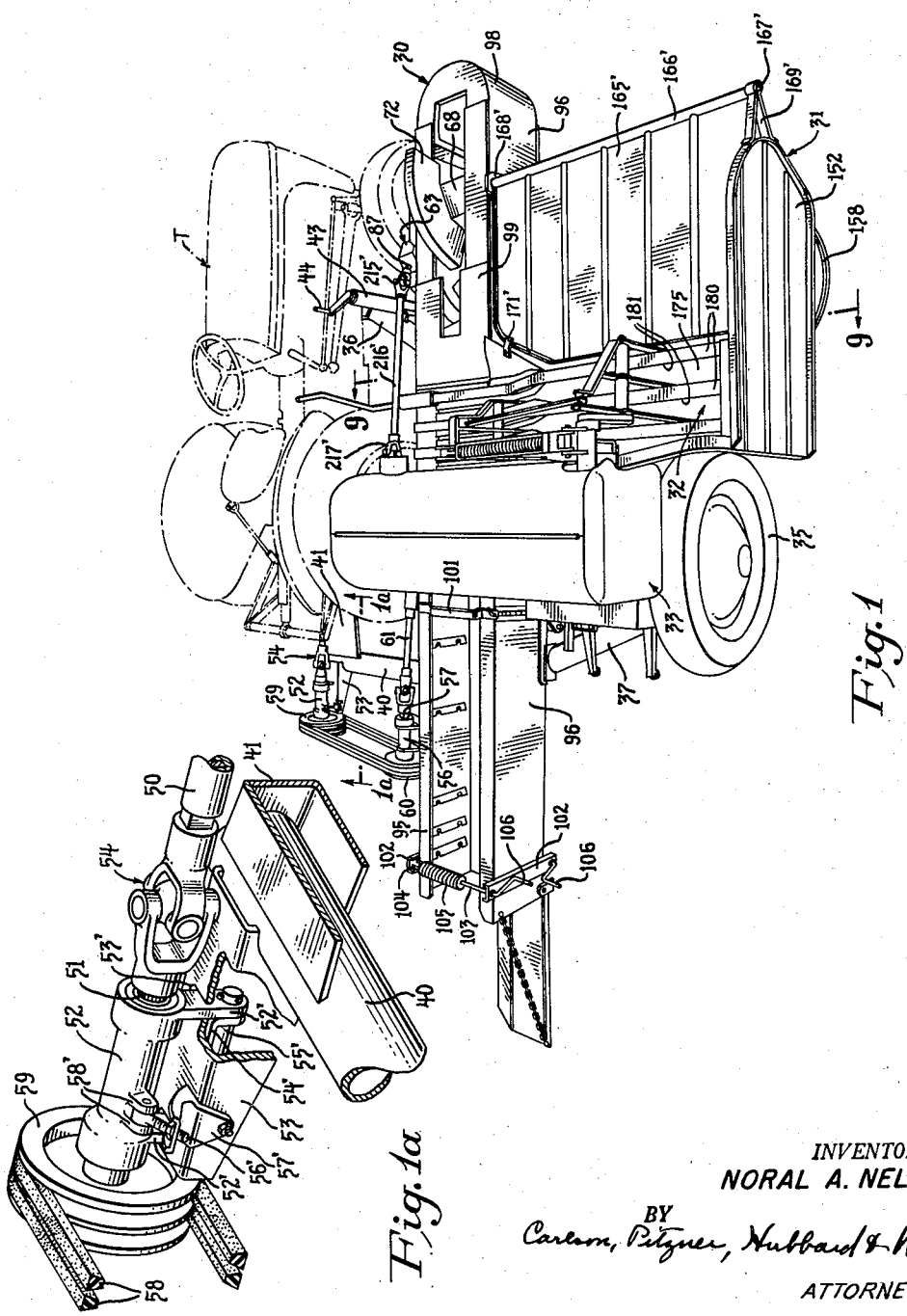
Fig. 1A is an enlarged fragmentary sectional view taken in a plane substantially on the line 1A—1A of Fig. 1.
Figure 2:
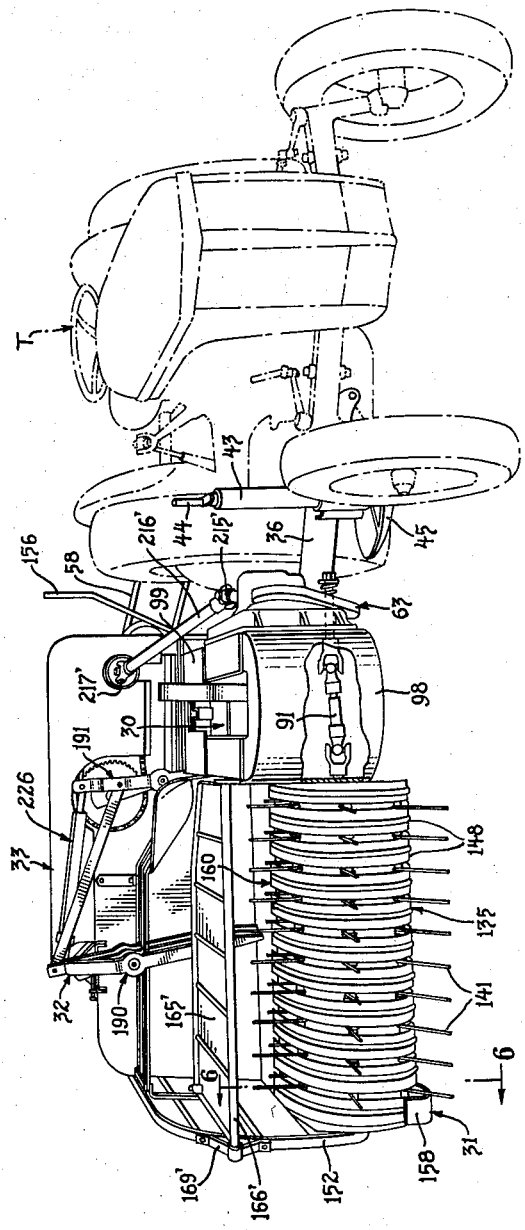
Fig. 2 is a front view of the baler and tractor shown in Fig. 1.

Referring to Figs. 1 and 2 of the drawings, the improved baler is made up of a group of interrelated mechanisms assembled into a compact, mobile unit and operating together to pick up material from the ground and process it into tightly compressed bales of uniform size securely tied by wire or twine. Thus, as shown in Figs. 1 and 2, the baler includes bale forming mechanism 30 for compressing material into bale form, pickup mechanism 31 for gathering material to be baled directly from the ground, and transfer mechanism 32 for transferring the picked up material to and packing it into the baling chamber. Operating in conjunction with the baling mechanism and in effect constituting a part thereof, is bale tying mechanism 33.

The several mechanisms or units constituting the baler are mounted on an A-shaped frame adapted to be supported at one side on a tractor T and on the other side by a ground wheel 35. The bale forming mechanism 30 as shown is located at the inboard side of the frame, that is, adjacent the tractor and is positioned to extend generally parallel to the tractor axis. The pickup mechanism 31 is supported at the outboard side of the frame somewhat forwardly of the center of the baling chamber in a position in which it can be easily observed by the tractor driver. The driver is thus enabled to quickly detect any misfunctioning of the machine and is also better able to guide the tractor along a path which will traverse the pickup mechanism along a windrow of the material to be picked up.

In the exemplary baler, the supporting frame structure for the elements above described comprises a pair of divergingly arranged frame members 36 and 37 suitably secured together at their apex and journaling the ground wheel 35 at that point. The frame members are preferably tubular and at their outer ends are fitted with suitable coupling elements for attachment to the tractor respectively adjacent the front and rear ends thereof.

Figure 3:
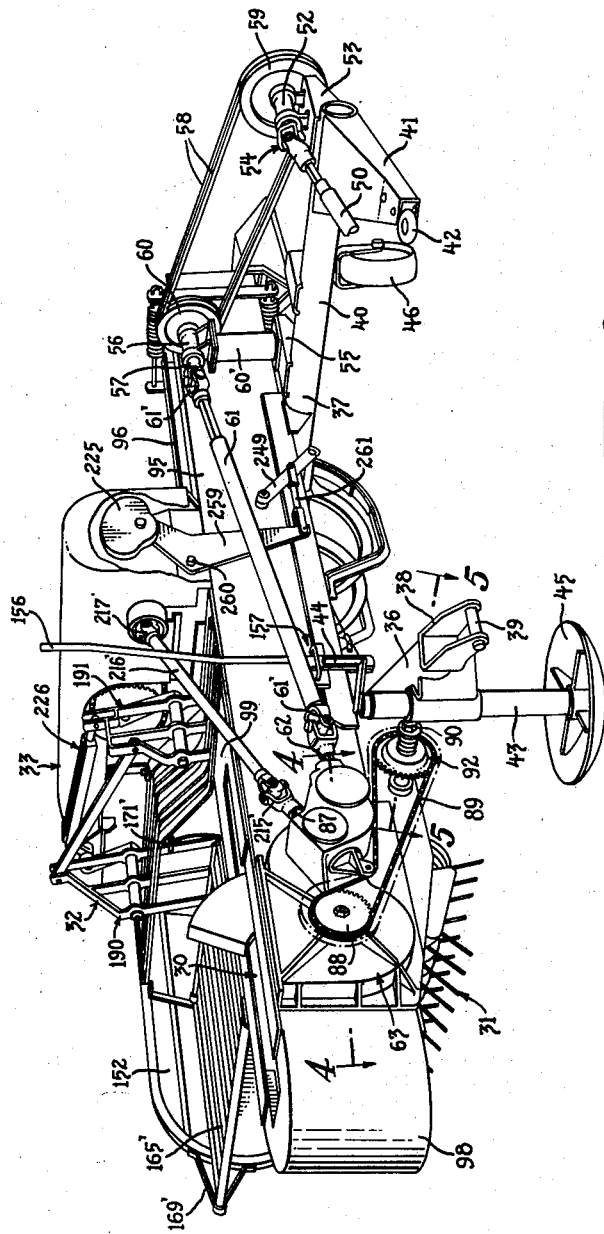
Fig. 3 is an elevational view of the inboard side of the baler.

Any suitable means may be utilized for coupling the baler frame to the tractor. In the exemplary baler as shown in Fig. 3, the front frame member 36 is provided at its outer end with a coupling element in the form of a clevis 38 adapted to engage over a mating coupling element on the tractor. The clevis in this instance carries a pin 39 engageable with suitable latch mechanism provided on the mating element as described in the above mentioned application. When the parts are coupled together the pin permits the frame to pivot relative to the tractor about a horizontal generaly fore-and-aft axis so that the baler can follow irregularities in ground contour without imposing undue stress on the equipment.

As further shown in Fig. 3, the rear frame member has a straight outer end portion 40 adapted to extend substantially perpendicular to the axis of the tractor and at least to the center line thereof. A rigid tongue 41 projecting forwardly from the end portion of the frame member carries a coupling element in the form of an eye 42 engageable by a coupling hook (not shown) provided on the tractor which is swung into coupling engagement with the eye 42 by the power lift of the tractor. Thereafter as the tractor is backed, the baler jackknifes to engage the front coupling elements. Accordingly, the baler can be coupled to and uncoupled from the tractor without requiring the driver to dismount from the tractor.

Provision is made for supporting the inboard side of the baler frame at substantially the normal operating level when the baler is uncoupled from the tractor. As herein shown, support is provided by an extensible jack stand having an elongated body 43 (Figs. 1–3 and 17) secured to the front frame member 36 in an upright position. An internally threaded sleeve within the body cooperates with a threaded support rod to shift the latter up and down as the sleeve is rotated by means of a hand crank 44. The support rod at its lower end is equipped with an enlarged, generally convex, ground-engaging foot 45. If desired, a similar support or a retractable caster wheel 46, as shown, may be provided on the rear frame member 37. When the baler is supported in the above manner, it may be coupled to the tractor without manhandling. After the baler is coupled on, the supports are retracted to an out-of-the-way position.

*Drive arrangement*

In the embodiment illustrated in Figs. 1, 1A, and 3 of the drawings, power for driving the elements of the baler is derived from the tractor engine by way of the rear power take-off shaft of the tractor. A propeller shaft 50 connected at one end of the power take-off shaft extends to and connects with a stub shaft 51 journaled in a bearing 52 suitably mounted on a bracket 53 rigid with and extending rearwardly from the end portion 40 of the rear frame member. The stub shaft 51 is preferably arranged horizontally and parallel to the axis of the tractor and, as it is located somewhat above the power take-off shaft, the connection with the propeller shaft is made through a universal joint 54. It will be understood that a similar universal joint is interposed between the other end of the shaft 50 and the power take-off shaft of the tractor.

A second bracket 55 on the frame member 40 located inboard of the same supports a bearing 56 journaling a second stub shaft 57. The shaft 57 is driven from the shaft 51 by a suitable drive connection such as the belt drive shown comprising a pair of V-belts 58 running over double grooved pulleys 59 and 60 non-rotatably fixed on the driving and driven shafts. To provide for adjustment of belt tension, the bearing 52 is preferably mounted to swing toward and from the shaft 57. To that end, the bearing 52 is provided at opposite ends with rigid depending arms 52' (Fig. 1A) adapted to extend through slots 53' in the bracket 53 and straddle the legs of a U-shaped hanger 54' welded or otherwise secured to the underside of the bracket 53. A pivot pin 55' extending through the arms and hanger legs connects the parts together.

Adjustment of the bearing 52 to regulate belt tension is effected through the medium of a bolt 56' interposed between the bearing and an abutment element 57' secured to the bracket 53. As shown in Fig. 1A, the bolt is pivoted at one end between a pair of lugs 58' on the bearing and its threaded end projects through a suitable opening in the element 57'. A nut 59' threaded on the bolt engages the upper face of the abutment element to adjust the position of the bearing 52 and to maintain it in adjusted position against the tension exerted by the belt 58.

Referring now to Fig. 3, it will be observed that shaft 57 is connected by a drive shaft 61 with the input shaft 62 (Figs. 3, 4 and 17) of a transmission 63 housed in a gearbox at the inboard side of the baler from which power is distributed to drive the elements of the baler as will appear later. As the bearing 56 for the shaft 57 is supported at a higher level than the gearbox, in this instance by a pedestal 60', to afford clearance for other elements of the baler, suitable universal joints 61' are interposed between the shaft 61 and the other shafts to accommodate their angular disposition.

The propeller shaft 50 preferably comprises two telescoping sections permitting variation in length to facilitate its attachment to and detachment from the tractor. Drive shaft 61 may also be of telescoping construction permitting convenient change from power take-off drive to an auxiliary engine drive. When an auxiliary engine is to be used, the stub shaft bearings 52 and 56 and the shafts are detached from the brackets 53 and 55 and the engine is mounted on the brackets in their place.

Figure 4:
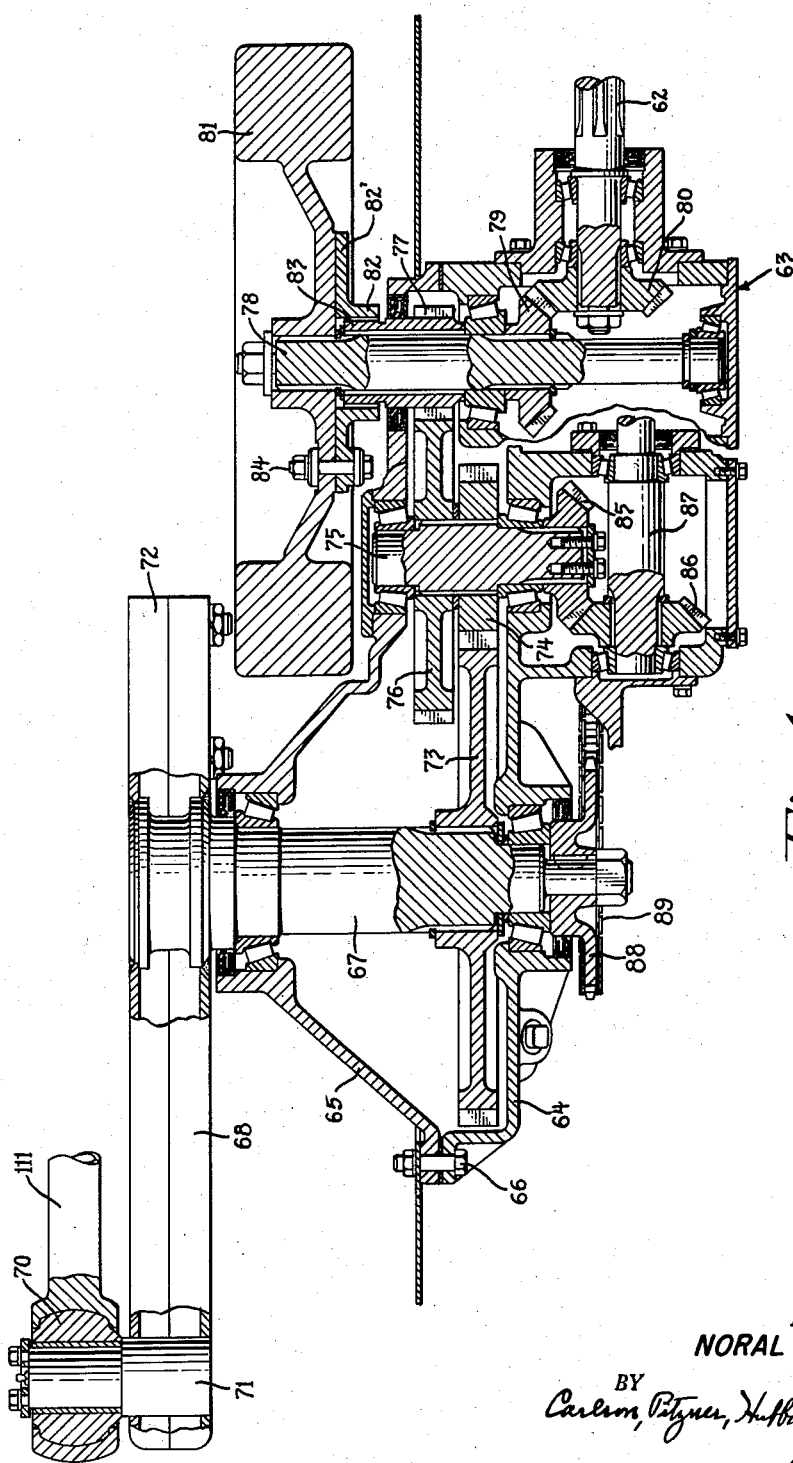
Fig. 4 is an enlarged horizontal sectional view through the gearbox or transmission taken in a plane substantially on the line 4—4 of Fig. 3.

Referring now to Fig. 4 of the drawings, the gearbox for the transmission 63 comprises flanged inner and outer sections 64 and 65 secured together as by bolts 66. Those sections journal a shaft 67 with its inner end projecting into the baling chamber and having welded or otherwise rigidly fixed thereon a counterweighted crank arm 68 for reciprocating the baling plunger. In the particular form illustrated, the crank is made up of a pair of sheet metal stampings of channel-shaped section assembled in facing relation and suitably secured together as by welding. Connection is made with the baling plunger through the medium of a ball and socket connection, the ball element 70 of which is rotatably mounted on a pin 71 fixed to the arm adjacent one of its ends. A weight 72 fixed on the other end of the arms serves to counterbalance the assembly.

The drive for the crank shaft 67 is through a speed reducing gear train including a large gear 73 keyed to the crank shaft and meshing with a pinion 74 keyed to a countershaft 75 journaled in the gearbox. A gear 76 keyed on the countershaft meshes with a pinion 77 rotatably supported on a flywheel shaft 78 which, in turn, is driven through bevel gears 79 and 80 from the transmission input shaft 62. A heavy flywheel 81 splined or otherwise nonrotatably secured on the outer end of the shaft 78 stores power for peak loads and smooths out the operation of the drive.

To prevent damage to the transmission or other parts of the machine in case any of the driven elements of the baler become jammed, a releasable driving connection is provided between the flywheel 81 and the pinion 77. The drive connection as shown comprises a drive member 82 splined on an extension or hub 83 of the pinion 77 which projects out of the gearbox and has a disc-shaped flange portion 82' adapted to abut against the adjacent face of the flywheel 81. A shear bolt 84 extending through the disc portion 82' and flywheel provides a driving connection for the crank shaft and other elements of the baler under normal operating conditions. Upon imposition of an excessive load on any driven part of the machine, however, the bolt 84 is sheared to interrupt the drive connection.

The pickup mechanism 31, transfer mechanism 32 and the bale tying mechanism 33 are also driven from the transmission 63 so that the operations of those mechanisms are automatically coordinated and timed with respect to the reciprocation of the baling plunger. The drive for the transfer and tying mechanisms is taken from the intermediate shaft 75 which, through bevel gears 85 and 86 drives a shaft 87 journaled in the gearbox and extending rearwardly and upwardly therefrom.

The drive for the pickup mechanism, on the other hand, is taken from the crank shaft 67. For this purpose the shaft has fixed to its inboard end a sprocket wheel 88 which, through a chain 89, drives a jack shaft 90 (Fig. 5) rotatably supported in bearings 88' carried in a bracket 89' rigid with the baler frame and disposed below the baling chamber. As shown the shaft 90 extends transversely of the baling chamber and an adjustable slip clutch 92 is interposed in the drive to prevent damage to the mechanism if rotation of any part of the pickup mechanism is accidentally blocked. The jack shaft 90 is connected by a universally jointed coupling shaft 91 with the pickup reel, as will be described in more detail later on.

Bale forming mechanism

Figure 9:
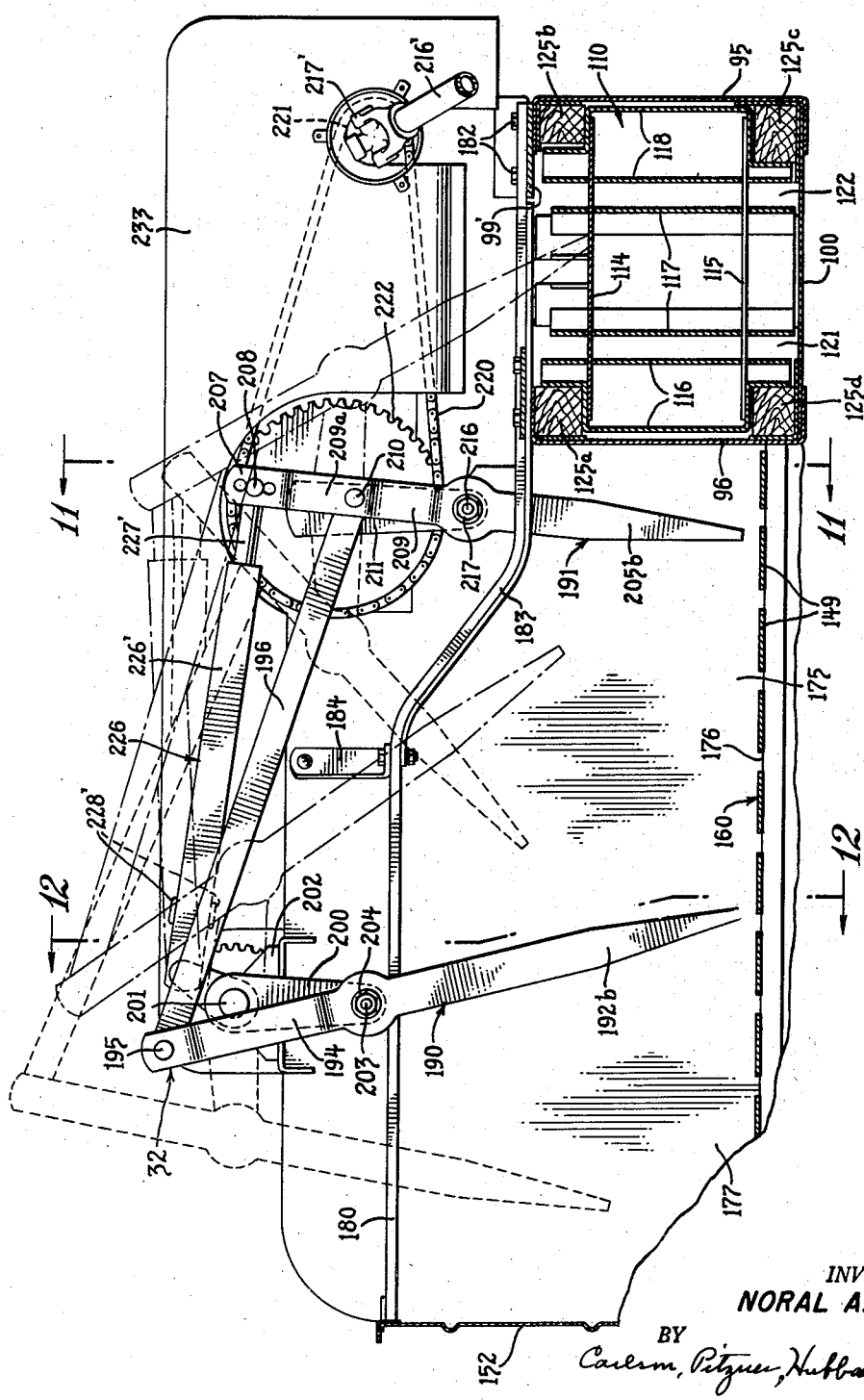
Fig. 9 is an enlarged transverse sectional view of the baler taken in a plane substantially on the line 9—9 of Fig. 1 showing details of the mechanism for transferring picked up material to the baling chamber.

The material to be processed is compressed and formed into bales in an elongated chamber of rectangular cross-section formed, in this instance, by opposed elongated channel-shaped side members 95 and 96 (Figs. 1, 3 and 9) assembled in parallel spaced relation. The members are secured together at their forward end by a rounded end cap 98 and by top and bottom plates 99 and 100 (Figs. 1 and 9). Cross braces 101 extending between the members also assist in holding them in predetermined spaced relation and thus retain the fixed dimensions of the forward portion of the chamber.

Adjacent the rear portion of the chamber the side members 95 and 96 are left free to flex laterally so that the cross-sectional area of the chamber may be adjusted. More particularly, the cross-sectional area may be reduced as compared to the area of the portion in which the bale is actually formed so that a predetermined frictional resistance is imposed on the movement of the bale rearwardly to the discharge end of the chamber. The resistance thus opposed to movement of the formed bale determines the degree to which the bale in course of formation will be compressed.

As shown in Fig. 1, the spacing of the baling chamber side members 95 and 96 is regulated by a pair of adjustable resilient links extending between a pair of upright channel bars 102 provided on the side members adjacent their aft ends. Each adjustable link, as shown, comprises a rod formed in two sections 103 and 104 connected by a coiled spring 105. One of the rods is screw threaded into the spring connection so that the over-all length of the link when unstressed can be varied, the spring 105 yielding, however, to permit extension upon application of a predetermined pressure to the side members 95 and 96 of the baling chamber. Cranks 106 on the rods 103 provide convenient means for manually adjusting the tension applied by the links to the baling chamber side members.

Substantially centrally of the baling chamber the side wall member 96, that is, the member adjacent the pickup mechanism, is cut away to form a passage through which material may be fed into that portion of the chamber in which the bales are initially formed. It will be understood, of course, that the aft end of the bale-forming portion of the chamber is defined by a previously formed bale which is yieldably retained in place by the frictional resistance or clamping effect exerted on the previously formed bale or bales due to the constriction of the discharge end of the baling chamber as above described.

Material fed into the baling chamber through the passage in the side wall is forced rearwardly and compressed by a plunger 110 (Fig. 9) reciprocable longitudinally in the baling chamber. Reciprocation is imparted to the plunger by the crank arm 68 through the medium of a connecting rod 111. The rod has a suitable socketed fitting in its forward end for cooperation with the ball element 70 on the crank arm, as shown in Fig. 4, and its rear end is pivotally connected to the plunger 110.

The plunger 110 may be of any preferred construction. Thus the exemplary plunger is made up of a series of sheet metal parts or stampings suitably shaped and welded or otherwise joined together to form a unitary structure. As shown in Fig. 9, the plunger comprises a pair of vertically spaced horizontal plates 114 and 115 interfitted with three upright generally channel-shaped stampings 116, 117 and 118. The latter are arranged with their end faces disposed in a common vertical plane to define the pushing face of the plunger. Preferably, the elements 116, 117 and 118 are spaced apart and the plates 114 and 115 are appropriately slotted to define channels 121 and 122 for the accommodation of the needles of the bale tying mechanism to be described later.

In accordance with the usual practice, cooperating shear plates are provided on the plunger and the adjacent wall of the baling chamber to cut off any of the material extending across the opening into the baling chamber. As is also common practice, adjustable means is provided for supporting and guiding the baling plunger 110 for reciprocation. As shown in Fig. 9, the supporting and guiding means includes four elongated wear members 125a, 125b, 125c and 125d mounted in recesses at the four corners of the plunger and extending longitudinally thereof for cooperation with fixed guides provided at the corresponding corners of the baling chamber.

Pickup mechanism

In the exemplary baler, material to be pressed into bales is fed into the baling chamber by the transfer mechanism 32 after it has been gathered from the ground by the pickup mechanism 31. Referring to Figs. 2 and 5–7 of the drawings, the pickup mechanism includes a toothed rake reel 135 disposed transversely of the machine and supported for rotation about a horizontal axis. The reel comprises a shaft 136 having rigidly attached spiders or discs 137 mounted adjacent its opposite ends. One or more of the discs may also be located intermediate the ends of the shaft, if desired. The discs support a series of tooth carrying bars 138, there being five such bars in the particular reel shown. Preferably, the bars are spaced about uniformly around the periphery of the reel. At one end of the reel the bars 138 are supported in suitable bearing recesses formed in the adjacent spider 137 and at the other end of the reel by a series of radially projecting brackets 139 bolted or otherwise rigidly attached to the marginal portions of the spider. Each bracket 139 has a bearing 140 (Fig. 8) supporting the associated bar for rocking movement about its longitudinal axis for purposes to be described later.

The bars 138 are preferably tubular and each is fitted with a series of flexible rake teeth 141. The rake teeth may be conveniently formed from stiff, heavy gauge wire stock and, as shown, are constructed as dual-tooth units. Thus, each unit comprises a central anchoring portion 142 built to fit around the bar 138 and having coiled portions 143 at opposite sides which terminate in elongated straight tine portions 144. Each tooth unit is rigidly secured to the bar as by a clamping bolt 145 (Fig. 7) cooperating with the anchoring portion 142 of the tooth. The coiled portions of the tooth encircle the bar and present the tines 144 in tangentially projecting relation to the bar.

Figure 6:
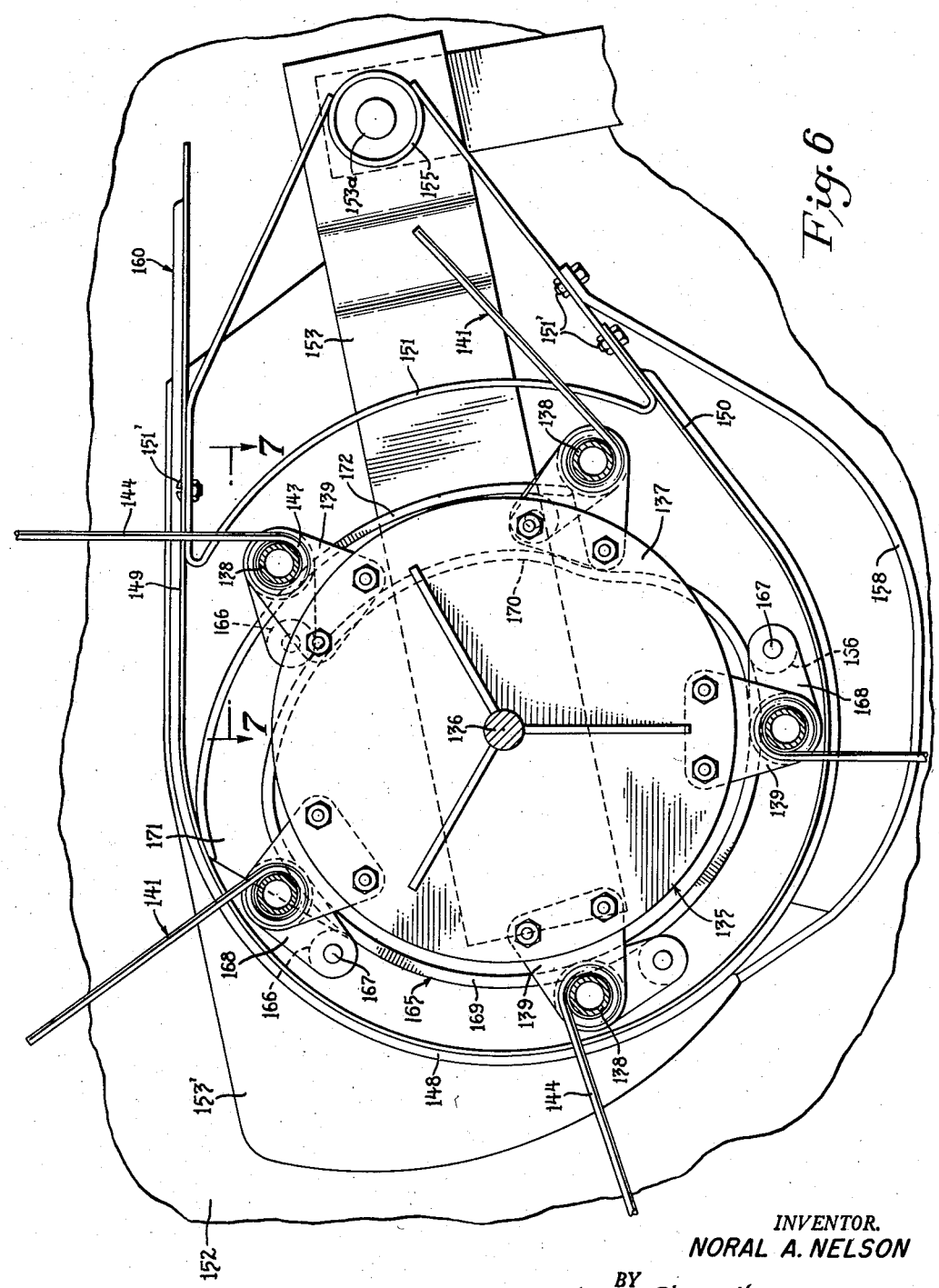
Fig. 6 is an enlarged transverse sectional view through the pickup mechanism taken in a plane substantially on the line 6—6 of Fig. 2.
Figure 7:
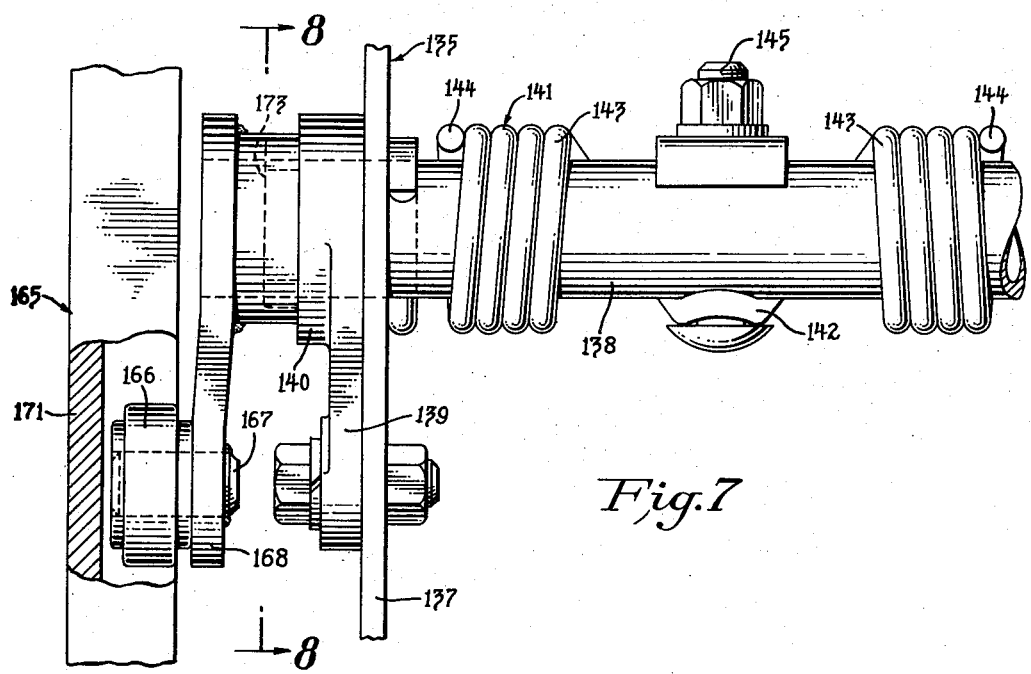
Fig. 7 is an enlarged fragmentary sectional view taken in a plane substantially on the line 7—7 of Fig. 6.

Preferably, the teeth 141 are similarly located on the several bars 138 so that the tines are disposed in axially spaced groups, with each group located in a common vertical plane. When assembled on its supporting structure, the reel is rotatable in a circumferentially slotted cage defined by a series of stripper plates 148 interposed between the groups of tines in closely spaced relation to the reel 135 (Fig. 6). Each of the stripper plates is longitudinally ribbed for stiffening purposes and is formed with a generally circular central portion terminating in rearwardly directed flat end portions 149 and 150 adapted to extend over the legs of a triangular supporting bracket 151 located rearwardly of the reel. The legs of the stripper plate may be rigidly secured to the bracket as by bolts 151'.

Figure 5:
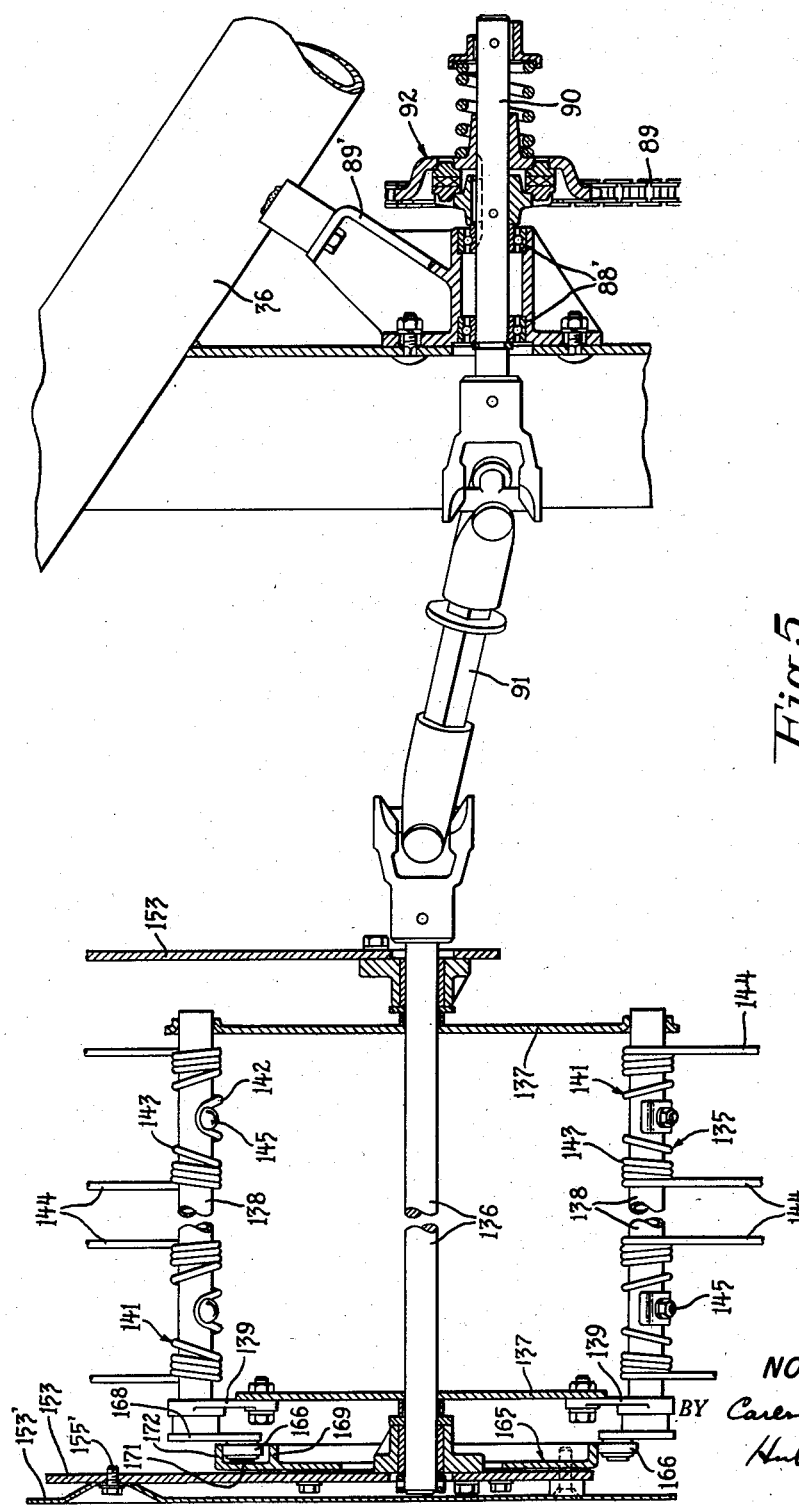
Fig. 5 is an enlarged fragmentary sectional view taken in a plane substantially on the line 5—5 of Fig. 3 showing the drive for the pickup reel.

To enable the pickup reel to follow the contour of the ground when the baler is in operation, and to permit retraction of the reel during transport of the baler, the reel and stripper plates associated with it are carried by a frame structure supported to swing about a transverse axis on the main frame of the baler between the inboard side of the baling chamber and a side plate 152 which thus define an open front compartment for the reel. The frame structure as herein shown comprises a pair of arms 153 pivotally mounted adjacent their aft ends on a shaft 153a (Fig. 6) supported on the baler frame. A tubular cross member 155 (Fig. 13) concentric with the supporting shaft rigidly connects the two arms 153 and supports the bracket 151, the legs of which may be welded or otherwise attached to the member. The outboard end of the reel may be fitted with a sheet metal guard 153' secured to the adjacent arm 153 as by screws 155' as shown in Fig. 5.

Swinging of the pickup reel assembly between operating and retracted positions is effected by means of a hand lever 156 (Fig. 3) pivoted on the inboard side of the baling chamber within easy reach of the tractor driver. The lever is connected to the frame structure by a suitable linkage and is provided with a conventional type latch mechanism 157 for retaining it in selected positions of adjustment. When released for operation, the reel assembly swings down and slides on a ground-engaging skid 158 which may be attached to the bracket 151, as shown in Fig. 6. Suitable spring means associated with the assembly counterbalances its weight so that the reel substantially floats in its adjusted position.

In operation, the reel 135 is driven from the transmission 63 through the jack shaft 90 and the universally jointed coupling shaft 91, as previously explained. The latter shaft, by reason of its jointed construction, accommodates the swinging movements of the reel assembly.

To enable the reel to pick up and discharge material most effectively, provision is made for maintaining the tines 144 in substantially radial relation to the reel axis as they pick up the material and carry it along the curved portions of the stripper plates. As the material is carried to the horizontal platform 160 defined by the flat legs 149 of the plates, the reel bars 138 are rocked about their longitudinal axes so that the tines are withdrawn from the material in an endwise direction. Preferably, the bars are rocked further in the continued rotation of the reel to enable them to pass through slots of minimum length in the legs of the bracket 151. This enables the bracket to be constructed so that maximum strength and rigidity is insured.

The preferred means for rocking the reel bars 138 in the manner above explained, comprises a stationary cam 165 (Figs. 5, 6 and 7) supported adjacent one end of the reel on the adjacent arm 153 for cooperation with suitable followers provided on the reel bars. As herein shown, each of the followers comprises a roller 166 rotatably supported by a pin 167 adjacent the outer end of a crank arm 168 fixed on the end of the associated bar 138. In its preferred form, the cam 165 comprises a metal plate having an upstanding rib 169 defining a continuous cam surface including a generally circular section and a section which recedes gradually from each end of the circular section as indicated at 170. Adjacent one end of the receding section 170 the cam plate is extended as by an integral web 171 terminating in an upstanding flange 172 presenting an arcuate cam surface opposed to that defined by the section 170.

As will be seen by reference to Fig. 6 of the drawings, the cam 165 is shaped so that each reel bar, as it approaches its lowest position, is rocked to project the tines 144 downwardly substantially radially of the reel. The hay or other material being gathered is thus picked up and carried upwardly toward the platform 160, the tines being retained in such radial positions by the cam section 169 until the material is deposited on the front edge of the platform. At this point, the follower rollers 166 pass from the cam section 169 to the receding surface of the cam section 170 which allows the bars to turn and the tines to swing back under the pressure of the material so that they may be drawn endwise therefrom. As the tines are withdrawn and thus freed of pressure from the material, the guide cam 172 cooperates with the follower rollers to keep the tines retracted until they have cleared the lower edge of the bracket 151. After the tines pass the bracket, the followers climb the sloping cam surface leading to the section 169 and the tines are swung back to a radial position for their next operating sweep.

Figure 8:
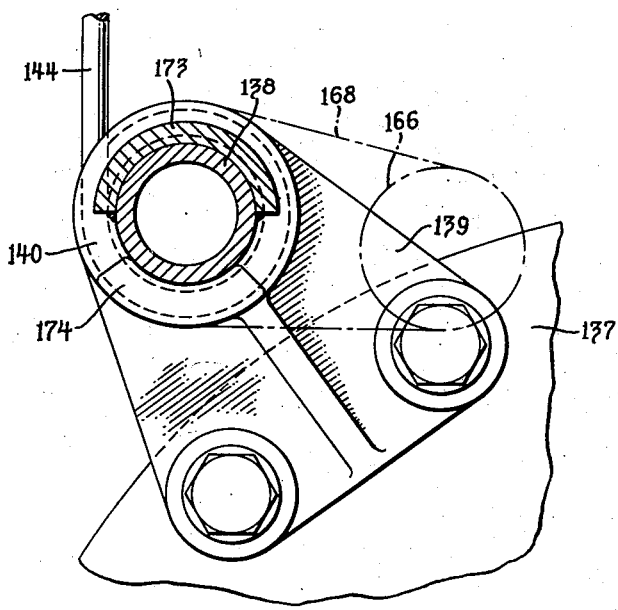
Fig. 8 is a fragmentary sectional view taken in a plane substantially on the line 8—8 of Fig. 7.

Provision is made for limiting the rocking motion of the reel bars 138 within predetermined limits. Such limiting means as shown in Fig. 8 comprise stop element 173 welded or otherwise fixed to each of the reel bars adjacent the end journaled in the bearing 140 and cooperating with a fixed stop lug 174 formed on the bearing.

To insure delivery of the picked up material to the transfer mechanism 32 in a relative uniform, compact stream and to prevent blowing of the material, a swinging wind-guard or hold-down plate 165' is provided in the reel compartment extending from substantially the forward edge of the reel to the entrance to the transfer chamber. The guard 165', as shown in Figs. 1 and 2, may comprise a sheet metal plate suitably ribbed for stiffness and formed along its forward edge with a cylindrical head 166' adapted to receive a pivot shaft 167'. This shaft is supported at one end on a suitable fitting 168' secured to the side member 96 of the baling chamber and at the other end by a bracket 169' rigid with and projecting forwardly from the side member 152. Suitable stops, such as the stop 171', are mounted on the frame structure above and below the cover adjacent its free edge to define limit positions for the guard. The upper stops are preferably retractable to permit the guard to be swung forwardly to expose the pickup reel for convenient access.

*Transfer mechanism*

The material deposited on the platform 160 by the pickup reel is pushed rearwardly into a transfer chamber 175 (Figs. 1, 9 and 10–12) at the rear of the platform in which it is moved transversely of the implement and packed into the baling chamber by the operating elements of the transfer mechanism 31. In the exemplary baler the transfer chamber 175 is defined by a horizontal floor 176 and a generally upright back wall 177. At the outboard side of the implement the chamber is closed by the sheet metal side panel 152 which extends forwardly to close the outer end of the pickup reel. The opposite end of the chamber 175 opens into the baling chamber for delivery of pickup material thereto by way of the side opening in the chamber. Preferably, the back wall 177 is angled rearwardly toward the discharge end of the chamber to increase storage capacity at the point where the material accumulates before entering the baling chamber.

To confine the material within the chamber 175 during the transfer operation, a series of elongated hold-down bars or rails 180 are provided at the top of the chamber, the bars extending crosswise of the baler and being spaced apart to define a series of slots 181 for the accommodation of elements of the transfer mechanism to be described later. As shown in Fig. 9, the bars 180 are supported at their outer ends adjacent the upper edge of the panel 152 at a level substantially above the top of the baling chamber. The bars extend for a portion of their length generally parallel to the floor 176 and, as they approach the baling chamber, they angle downwardly and terminate in straight portions adapted to extend over and rest on an extension 99' of the top plate 99 joining the side members of the baling chamber. The rails may be secured to the extension in any suitable manner, as by bolts 182.

The downward angling of the bars 180 serves to press the material down and guide it into the baling chamber in its passage through the transfer chamber. To assist in this action each bar has attached to its underside a flat guide rail 183 which, as shown in Figs. 9 and 10, is substantially wider than the bar. The width of the slots 181 is thus substantially reduced in the areas immediately adjacent and above the baling chamber, thereby insuring retention of the material being transferred.

To close the gap resulting from the widening of the chamber 175 toward its discharge end, an auxiliary guide rail 183' (Fig. 10) is provided at the back of the chamber and disposed parallel with the companion rails 183. The auxiliary rail may be supported at its outer end in any suitable manner, as by a bracket 184 fixed to the back wall 177 of the transfer chamber. Adjacent its other end, the auxiliary rail may be formed with an upright flange 185 (Fig. 11) for attachment to the frame structure of the baler.

The transfer mechanism 31, provided by the invention, includes power driven means of simple, sturdy construction for pushing the material longitudinally of the transfer chamber 175 and for discharging it into the baling chamber between the strokes of the plunger 110. As shown in Figs. 9–12 of the drawings, this material pushing means comprises two packer finger assemblies, including an outboard assembly 190 (Figs. 9 and 12) and an inboard assembly 191 (Figs. 9 and 11) operating in timed relation to advance the material through the chamber in successive batches. More particularly, the finger assemblies are supported and driven with a combined rotary and oscillating movement that enables the outboard finger assembly to sweep along successive masses of material into position in which it can be picked up by the inboard assembly. The latter assembly continues the sweeping motion, sweeping the material out of the transfer chamber and into the baling chamber. These movements of the finger assemblies are coordinated with the reciprocation of the baling plunger, as will appear presently.

While the finger assemblies 190 and 191 may be of any desired construction, that shown in Figs. 9–12 is preferred for simplicity, ruggedness and efficiency of operation. As shown in Fig. 12, the finger assembly 190 comprises three elongated bars 192, 192a and 192b assembled in spaced parallel relation and rigidly secured together as a unit by a sleeve element 193 to which the bars are suitably attached as by welding. The bars are apertured adjacent their connection with the sleeve element so that the latter is enabled to constitute a supporting bearing for the assembly. The longer portions of the bars extend below the sleeve 193 and constitute the material-engaging finger elements of the assembly. The upper portions of the bars are extended above the sleeve, the inner or rear bar 192 being straight while the outer or front bar 192b has a section 194 bent rearwardly to bring its upper end closely adjacent the rear bar and cooperating with it in supporting a pin 195 pivoting one end of a link 196. This link affords a connection with the inboard finger set, as will be explained later. The intermediate bar 192a is extended to the section 194 of the outer bar and welded or otherwise rigidly connected thereto. Thus, the three bars or finger elements and their bearing sleeve constitute a unitary structure that is both strong and rigid.

The finger assembly 190 is supported for bodily rotation in a circular orbit and for pivotal movement about the axis of the sleeve 193 by means of a crank 200 fixed to one end of a shaft 201 journaled in a bearing 202 supported on a tubular member 202a forming a part of the frame structure. The crank arm at its outer end carries an elongated pin or stub shaft 203 which extends through and has a bearing in the sleeve 193. A nut 204 threaded on the end of the shaft retains the assembly in place thereon.

The companion finger assembly 191 as shown in Figs. 9 and 11 also comprise three elongated bars 205, 205a and 205b arranged in spaced parallel relation and rigidly assembled as a unit on a sleeve element 206 to which the bars are welded. Each of the bars is extended below the sleeve to form material-engaging finger elements, which in this instance extend through the slots 181 into the transfer chamber 175. The inner or rear bar 205 is extended straight up from the sleeve and has welded thereto an L-shaped bracket 207 which, with the bar, defines a yoke for supporting a strut anchoring pin 208.

As best shown in Fig. 11, the outer bar 205b has its upper end portion bent to present an inclined section 209, a vertical section 209a and a horizontal section 209b which extends to and is joined as by welding to one leg of the bracket 207. The intermediate bar 205a is extended to and joined as by welding to the horizontal section 209b and cooperates with the vertical section 209a of the bar 205b to support a pin 210 for anchoring the link 196 to the finger assembly 191.

The finger assembly 191 is likewise supported for bodily rotation and for oscillation about the axis of the sleeve 206, the rotational axis being parallel to that of the companion assembly and located at a slightly lower level as shown in Fig. 9. The support for the assembly is provided in this instance by a crank arm 211 fixed on the forward end of a shaft 212 journaled in a bearing 213 forming a part of a bracket 214 bolted to the top of a hollow, generally rectangular frame member 215 which serves additionally as a support for elements of the bale tying mechanism, to be described later. Crank arm 211, adjacent its outer end, carries a pin 216 extending through and journaled in the sleeve 206 of the finger assembly 191. A nut 217 threaded on the end of the pin retains the finger assembly in place.

Provision is made for rotating the finger supporting and driving shafts 201 and 212 at the same speed and in timed relation to the reciprocation of the baler plunger. Power for driving shafts is taken from the shaft 87 at the gearbox which is connected by universal joint 215' (Figs. 1, 2 and 3), shaft 216' and a universal joint 217' with an intermediate shaft 218 (Fig. 10) journaled in a bearing 219 supported on the frame member 215. A drive connection from the shaft 218 to the shaft 212 is provided by a drive chain 220 running over a sprocket wheel 221 on the shaft 218 and a sprocket 222 on the shaft 212, as shown in Figs. 9 and 10. Shaft 212 in turn is drivingly connected with the shaft 201 by a drive chain 223 running over sprocket wheels 224 and 225 keyed to the respective shafts.

As the shafts 201 and 212 rotate, the finger assemblies 190 and 191 are traversed bodily in a circular path or orbit. To impart oscillating motion of the finger assemblies to sweep their lower ends through the transfer chamber, the assembly 191 is anchored at its upper end to a rigid portion of the frame structure. Anchoring in the present instance is effected by a link 226 connected to the assembly 191 at one end by the pivot pin 208 and having its other end pivoted on pin 227 (Fig. 10) carried between a pair of upstanding lugs 228 rigid with the bearing 202 for the shaft 201. Oscillating movements of the fingers 191 are transmitted to the companion finger assembly 190 through the medium of the link 196 which, as previously explained, is connected at opposite ends to the finger assembly by the pivot pins 195 and 210.

The character of the movements imparted to the finger assemblies by the exemplary linkage will be readily seen by reference to Fig. 9 of the drawings. Thus, as the crank arm 211 swings through the lower half of its arcuate path, the finger assembly 191 moves from the position shown in dotted line downwardly to that shown in full line and thence upwardly to that shown in dot-dash line.

When the crank arm is in its lowest position, finger assembly is held in a generally upright position with the finger elements 205, 205a and 205b extending down through the slots 181 closely adjacent the floor 176 of the transfer chamber.

On initial assembly the shafts 201 and 212 are orientated so that the crank arms 200 and 211 occupy the related angular positions at all times. By reason of the connection provided by the link 196, the finger assembly 190 accordingly sweeps through the arc between the positions shown in dotted and dot-dash lines. This arc is somewhat shorter than the arc traveled by the assembly 191. Furthermore, the dimensioning of the link 196 is such that in its downward or entering movement the finger elements of the assembly 190 are substantially vertical so that they penetrate the material with a minimum of effort. In their continued movements, finger elements sweep close to the floor 176 of the transfer chamber and effectively carry the material ahead of them along the chamber and into a position in which the companion finger elements of the assembly 191 can engage such material in its next downward sweep.

Continued rotation of the shafts 201 and 212 raises the finger assemblies and withdraws them respectively from the transfer and baling chambers in a substantially endwise movement. The finger elements then swing outwardly toward the position shown in dotted lines to re-enter the transfer chamber and engage and shift another batch of material along the transfer chamber.

To prevent damage to the transfer mechanism in case the movement of either set of transfer fingers is blocked, the link 226 is constructed for yieldable extension under such conditions. More particularly, the link 226 is made up of two telescoping, resiliently connected sections. As shown in Fig. 10, one section of the link comprises an elongated U-shaped member 226' having parallel legs anchored on the pivot pin 227.

The central portion of the member 226' is apertured to slidably receive the other link section which is preferably in the form of a rod 227' having a head at its outer end apertured for the reception of the pivot pin 208. Fixed on the inner end of the rod 227' is a guide element 228' fitted between the legs of the member 226' and adapted to slidably engage therewith to guide the link sections in their relative endwise or telescoping movements. A spring 229' interposed between the guide element 228' and the end portion of the member 226' acts to yieldably maintain the link sections in a contracted condition. The spring, of course, is adapted to yield and permit extension of the link sections when the resistance to movement of either transfer finger exceeds a predetermined value.

It will be evident from the foregoing that the supporting and driving arrangement for the transfer finger assemblies enables them to describe coordinated sweeping arcs through the transfer chamber to advance the material therein in successive batches and pack it into the baling chamber. The movements of the finger assembly are of such amplitude and are so timed that the mass material pushed along by the finger assembly 190 in one cycle of operation is engaged and pushed into the baling chamber by the companion assembly 191 in the succeeding cycle. Since the transfer mechanism is driven from the main transmission, it will be evident that the action of the finger assemblies is accurately coordinated with the reciprocation of the baling plunger 110. In practice, the timing is such that each batch of material is swept into the baling chamber when the plunger is retracted and the assembly is withdrawn from the chamber in ample time to avoid interference with the advance of the plunger. Thus, successive batches of material are packed into the chamber by the finger assembly 191 and such batches are compressed against material previously fed into the chamber and pushed rearwardly in the chamber until the bale has been built up to the desired dimensions.

*Bale tying mechanism*

When the bale reaches a predetermined length as determined by a metering device 230 (Fig. 13), it is automatically tied by the tying mechanism 33. The tying mechanism may be arranged for tying the bales with twine or wire as desired. The exemplary baler has been shown with wire tying mechanism 231 supported on the frame structure 215 above the baling chamber and enclosed in a sheet metal housing 233 having its rear portion hinged as at 234 to swing upwardly and thus provide access to the mechanism. The strand material employed for tying the bales is supplied in continuous strands from a group of spools or rolls 235 carried in compartments provided in a housing 236 supported between the frame members 37 and 202a, as shown in Fig. 13.

The exemplary baler is equipped for tying bales with two strands wrapped lengthwise of the bales and consequently two similar wire twisting units are provided. To provide continuous strands, the tying material is supplied from four spools, each disposed in a separate compartment in a housing 236 supported at the rear of the transfer chamber as shown in Fig. 13. As a matter of convenience, the compartments are arranged in pairs, one above the other. Wires 237 from the spools in the two upper compartments are led across the top of the bale. Wires 238 from the spools in the two lower compartments are led across the bottom of the bale. In operation the corresponding wires 237 and 238 are joined to define a continuous loop across the end of the baling chamber, as will appear presently.

To properly locate the wires with respect to the bale, the upper wires 237 are respectively led transversely across the baling chamber and then rearwardly along the top of the bale in process of being formed. Suitable guides are provided to present the wires for engagement by the associated wire twisting unit as shown in Fig. 14. The lower wires 238 are directed into operative relation with the bale by way of guide rollers 240 carried, in this instance, on a needle guard 240' supported from the underside of the baling chamber and needle mechanism later described.

The upper and lower wires of each pair when joined, as by a splice 245 (Fig. 14), form a continuous vertical run or loop across the baling chamber. Consequently as the bale is pushed rearwardly in the chamber by the baling plunger, the two wires are pulled out so as to maintain wraps about the end, the top and the bottom sides of the bale. Upon completion of the bale, that is, when it attains a desired length, a pair of curved needles 246 normally disposed below the baling chamber, as shown in Fig. 14, are projected through suitable openings 243' in the bottom of the baling chamber and then upwardly through the chamber. In their upward movement, the needles carry the lower wires 238 upwardly through the baling chamber and alongside the upper wires 237 for presentation to a twister unit. The pairs of wires are then joined by the twister unit which also severs the wires in a manner that leaves those around the bale securely joined. The companion upper and lower wires from the reels are also joined to provide the continuous loop for the next bale.

The tying operation takes place while the baling plunger 110 is retracted from the bale. Provision is therefore made for holding the material at the forward end of the bale in place until the tying wire is wrapped around it. The holding means, as shown, comprises a stop finger 244' (Fig. 14) pivoted as at 245' on a part of the frame structure 215 overlying the baling chamber and having its hook-shaped free end extending down into the chamber. A spring 246' urges the finger toward the operated position shown in the drawings but permits it to retract upwardly as each charge of material is pushed back by the baling plunger. Resilient elements 247' provided on the finger coact with the frame structure to cushion the shock as the finger is snapped back to operated position.

13

The needles 246 are alike and, as shown in Fig. 14, each comprises a curved bar 247 welded or otherwise rigidly fixed at one end of a cross shaft 248. The cross shaft is secured between the lower ends of a pair of depending arms 249 respectively pivoted as at 250 at opposite sides of the baling chamber. At their other or free ends, each of the needle bars 247 terminates in a tip portion 251 comprising a pair of plates spaced apart to accommodate guide rollers 252 and 253. The rollers are spaced apart longitudinally of the needles so as to present an unobstructed length of the wire to the tier, as will appear presently. As the needles swing upwardly, each guide roller 252 engages one of the wires 238 and carries it up through the baling chamber. When the needle is substantially vertical, the companion guide roller 253 engages the wire to maintain it taut during the tying operation. In the upward movement of the needles the rollers also engage the wire 237 and thus carry the two wires together in side-by-side relation to the twisting unit. A guide roll 253' (Fig. 14) cooperating with the upper wire 237 prevents it from being lifted from the bale during the tying operation. To afford clearance for the tying mechanism the needle tip 251 is recessed as at 254 between the rollers.

The needle assembly is rocked between the idle or rest position in which it is shown in Fig. 14, and the fully operated position by a cam 255 (Figs. 3 and 13) mounted on a cyclically driven shaft 256 which also serves to drive the wire twister 231. The cam 255 has a continuous suitably shaped groove 257 in its inner face within which rides a follower 258 carried on the upper end of a lever 259 (Fig. 3) pivoted intermediate its ends as at 260 on the frame structure of the baler. An adjustable link or pitman 261 operatively connects the other end of the lever 259 with one of the arms 249, in this instance, the arm at the inboard side of the baling chamber.

To prevent damage to the needles 246 in case they become jammed in or are not withdrawn from the baling chamber before the next plunger advance, provision is made for positively blocking the plunger advance. Briefly, the blocking means includes a stop element 248' pivoted below the baling chamber and adapted to swing through a slot in the bottom of the chamber into and out of the path of the plunger. A spring yieldably urges the stop to blocking position. Through the medium of a flexible tension member 250' and a pivoted actuating member 251' engageable by an element of the needle assembly, the stop is withdrawn from the path of the plunger when the needle assembly is swung to the withdrawn position shown in Fig. 14. As the assembly is swung to operated position, tension on the member 250' is relieved permitting the stop to swing to blocking position.

As shown in Fig. 13, the shaft 256 is journaled at opposite ends in bearings 262 and 263, the latter being formed as a part of the bracket 214 carrying the bearing 213 for the transfer finger shaft 212, which, as explained heretofore, is rigidly supported on the box-type frame member 215. The bearing 262 in this instance is formed as a part of a bracket 264 bolted or otherwise suitably attached to the top of the frame member 215 adjacent the inboard end of the member.

The shaft 256 is driven in timed relation to the drive for the other elements of the baler from the transfer finger shaft 212 through the medium of a single revolution clutch 265 engaged under control of the metering device 230.

Baler towing arrangement

Provision is made for coupling the baler to the tractor T in towing relation, as shown in Fig. 17, to permit convenient passage through gates or other openings too narrow to accommodate the tractor and baler when coupled in side-by-side relation. For this purpose, a rigid cross-member 385 in the form of a steel plate is welded or otherwise secured along the bottom of the end cap 98 as shown in Fig. 18. The plate is centrally apertured to receive a bolt 386 having at its lower end a downwardly facing clevis 387. A nut 388 threaded on the upper end of the bolt retains the parts in assembled relation.

The clevis 387 is dimensioned to fit over a cross-member 389 connected between the tractor draft links and forming a pair of the tractor hitch mentioned heretofore. A linch pin 390 inserted through alined apertures in the legs of the clevis prevents accidental uncoupling of the baler.

It will be apparent from the foregoing that the invention provides a baler embodying novel features of construction which insure efficient, trouble-free operation. The improved hitch arrangement enables the baler to be coupled to and uncoupled from a tractor very quickly and easily and with a minimum of effort on the part of the operator. When coupled to the tractor, the baler and tractor become, in effect, a compact, easily maneuverable unit with the pickup mechanism located for most convenient observation by the driver, thereby materially simplifying the job of guiding the implement along the windrows of material to be baled.

The smooth and gentle action of the mechanism which picks up the material from the ground and the mechanism which moves the material into the baling chamber minimizes leaf shattering and thus preserves the best portions of forage crops. The mechanisms are simple and rugged and require a minimum of adjustment and care to keep them in proper operating condition.

I claim as my invention:

1. In a baler having a baling chamber with a plunger reciprocable therein, mechanism for picking up material to be baled directly from the ground and mechanism for transferring the picked up material to the baling chamber, a drive mechanism comprising a rotatably driven flywheel shaft, an intermediate shaft driven from said flywheel shaft through speed reduction gearing, a third shaft driven from said intermediate shaft through speed reduction gearing, crank means on said third shaft connected with and operative to reciprocate the plunger, means providing a drive connection from said third shaft to said pickup mechanism, and means providing a driving connection from said intermediate shaft to said transfer mechanism independently of said third shaft.

2. In a baler having a baling chamber with a plunger reciprocable therein, mechanism for picking up material to be baled directly from the ground and mechanism for transferring the picked up material to the baling chamber, a drive mechanism comprising a rotatably driven flywheel shaft, an intermediate shaft driven from said flywheel shaft through speed reduction gearing, a third shaft driven from said intermediate shaft through speed reduction gearing, crank means on said third shaft connected with and operative to reciprocate the plunger, a chain and sprocket connection between said third shaft and the pickup mechanism for driving the latter in timed relation to the reciprocation of the plunger, and a shaft and gearing connecting said intermediate shaft to said transfer mechanism independently of said third shaft for driving it in timed relation to the pickup mechanism.

3. In a baler having a baling chamber with a plunger reciprocable therein, mechanism for picking up material to be baled directly from the ground and mechanism for transferring the picked up material to the baling chamber, a drive mechanism comprising a rotatably driven flywheel shaft, an intermediate shaft driven from said flywheel shaft through speed reduction gearing, a third shaft driven from said intermediate shaft through speed reduction gearing, crank means on said third shaft connected with and operative to reciprocate the plunger, a drive connection between said third shaft and said pickup mechanism, a drive connection between said intermediate shaft and said transfer mechanism, and release means interposed in the drive between said flywheel shaft and said intermediate shaft for interrupting the drive for the plunger and both of said mechanisms in case any one of them becomes jammed.

4. In a baler having a baling chamber with a plunger reciprocable therein, mechanism for picking up material to be baled directly from the ground and mechanism for transferring the picked up material to the baling chamber, a drive mechanism comprising a rotatably driven flywheel shaft, an intermediate shaft driven from said flywheel shaft through speed reduction gearing, a third shaft driven from said intermediate shaft through speed reduction gearing, a crank means on said third shaft connected with and operative to reciprocate the plunger, a drive connection between said third shaft and said pickup mechanism, a drive connection between said intermediate shaft and said transfer mechanism, the driving connection between said flywheel shaft and said intermediate shaft including a shear bolt effective to interrupt the drive for the plunger and both of said mechanisms in case the reciprocation of the plunger is blocked.

5. In a baler having mechanism for picking up crop material from the ground and bale forming mechanism including a chamber with a plunger reciprocable therein, means for transferring material picked up by said first mechanism to the baling chamber ahead of the plunger comprising, in combination, means defining a transfer chamber open at one side to receive the picked-up material and having a discharge opening at one end communicating with the baling chamber, a pair of elongated finger assemblies spaced apart longitudinally of the transfer chamber and having their lower ends extending into that chamber, means pivotally supporting said assemblies intermediate their ends, said supporting means being independently revoluble about axes disposed above and transversely of the transfer chamber to traverse the assemblies bodily in circular paths, means including a rigid link connected between the implement frame and the upper end of one of said assemblies, a second rigid link connecting the upper ends of the assemblies, said links operating to cause the lower ends of the fingers to swing through arcuate paths within said transfer chamber incident to the rotation of said supporting means, one of said assemblies being operative to sweep successive masses of material along the chamber and into the path of the other assembly, said other assembly being operative to sweep the masses of material through the discharge opening into the baling chamber.

6. In a baler having mechanism for picking up crop material from the ground and bale forming mechanism including a chamber with a plunger reciprocable therein, means for transferring material picked up by said first mechanism to the baling chamber ahead of the plunger comprising, in combination, means defining a transfer chamber open at one side to receive the picked-up material and having a discharge opening at one end communicating with the baling chamber, a pair of elongated finger assemblies spaced apart longitudinally of the transfer chamber and having their lower ends extending into that chamber, means pivotally supporting said assemblies intermediate their ends, said supporting means being independently revoluble about axes disposed above and transversely of the transfer chamber to traverse the assemblies bodily in circular paths, means acting on the upper ends of said assemblies to cause them to swing on their pivots in response to the rotation of said supporting means and thereby traverse the lower ends of the assemblies in predetermined arcs within said transfer chamber, said last mentioned means being constructed and arranged to swing one assembly through a longer arc than the other assembly.

7. In a baler having mechanism for picking up crop material from the ground and bale forming mechanism including a chamber with a plunger reciprocable therein, means for transferring material picked up by said first mechanism to the baling chamber ahead of the plunger comprising, in combination, means defining a transfer chamber open at one side to receive the picked-up material and having a discharge opening at one end communicating with the baling chamber, a pair of elongated finger assemblies spaced apart longitudinally of the transfer chamber and having their lower ends extending into that chamber, means pivotally supporting said assemblies intermediate their ends, said supporting means being independently revoluble about axes disposed above and transversely of the transfer chamber to traverse the assemblies bodily in circular paths, means for swinging the lower ends of the assemblies through predetermined arcuate paths within said transfer chamber in response to the rotation of said supporting means, said swinging means including a first link connected between the baler frame and the upper end of one of the assemblies, and a second link connected between the upper end of the other assembly and a pivot on said one assembly spaced substantially from the upper end of that assembly.

8. In a baler having mechanism for picking up crop material from the ground and bale forming mechanism including a chamber with a plunger reciprocable therein, means for transferring material picked up by said first mechanism to the baling chamber ahead of the plunger comprising, in combination, means defining a transfer chamber open at one side to receive the picked-up material and having a discharge opening at one end communicating with the baling chamber, a pair of elongated finger assemblies spaced apart longitudinally of the transfer chamber and having their lower ends extending into that chamber, means pivotally supporting said assemblies intermediate their ends, said supporting means being independently revoluble about axes disposed above and transversely of the transfer chamber to traverse the assemblies bodily in circular paths, means for swinging the lower ends of the assemblies through predetermined arcuate paths within said transfer chamber in response to the rotation of said supporting means, said swinging means including a first link connected between the baler frame and the upper end of one of the assemblies, a second link connecting the assemblies together adjacent their upper ends, one of said links being extensible under tension to allow the supports to rotate without rocking the assemblies in case either assembly encounters an obstruction.

9. In a baler having mechanism for picking up crop material from the ground and bale forming mechanism including a chamber with a plunger reciprocable therein, means for transferring material picked up by said first mechanism to the baling chamber ahead of the plunger comprising, in combination, means defining a transfer chamber open at one side to receive the picked-up material and having a discharge opening at one end communicating with the baling chamber, a pair of elongated finger assemblies spaced apart longitudinally of the transfer chamber and having their lower ends extending into that chamber, means pivotally supporting said assemblies intermediate their ends, said supporting means being independently revoluble about axes disposed above and transversely of the transfer chamber to traverse the assemblies bodily in circular paths, means for swinging the lower ends of the assemblies through predetermined arcuate paths within said transfer chamber in response to the rotation of said supporting means, said swinging means including a first link connected between the baler frame and the upper end of one of the assemblies, a second link connecting the assemblies together adjacent their upper ends, said first link being extensible under tension applied thereto by either assembly being blocked against swinging.

10. In a baler or the like, in combination, a horizontally disposed toothed reel rotatable to pick up loose material from the ground as the baler is traversed thereover, a platform adapted to receive the material picked up by the reel, means defining a chamber disposed at the rear of said platform including a floor, a back wall and one end wall for the chamber, said chamber being open at the front for receiving material from said platform and having the end opposite said end wall open for the discharge of material, said back wall being angled rearwardly to increase the area of the chamber adjacent the discharge end, a series of hold-down bars extending across the full length of said chamber for retaining material therein, an auxiliary hold-down bar disposed parallel to said series of bars adjacent the widened discharge end of the chamber and means for conveying material along said chamber to said open end, said means including a plurality of transfer fingers mounted above said chamber and alined in parallel rows for reciprocation between said bars.

11. In a baler, in combination, a baling chamber having an opening at one side, means defining a material transfer chamber communicating at one end with the baling chamber through said opening, means associated with said baler for delivering material to be baled to said transfer chamber, means adjacent said baling chamber for pushing the material through the transfer chamber and into said baling chamber, means including a series of bars extending across said transfer chamber for retaining material therein, said bars being angled downwardly toward the discharge end of the transfer chamber to compress the material and guide it into the baling chamber, said means for pushing including a plurality of transfer fingers mounted above said chamber and alined in parallel rows for reciprocation between said bars.

12. In a baler or the like, in combination, a horizontally disposed toothed reel rotatable to pick up loose material from the ground as the baler is traversed thereover, a platform adapted to receive the material picked up by the reel, means defining a chamber disposed at the rear of said platform including a floor, a back wall and one end wall for the chamber, said chamber being open at the front for receiving material from said platform and having the end opposite said end wall open for the discharge of material, a series of hold-down bars extending across said chamber from one end to the other, said bars being substantially parallel to said floor for a substantial portion of their length and then angling downwardly so as to compress the material as it approaches the discharge end of the chamber, and means for conveying material along said chamber to said opened end, said means including a plurality of transfer fingers mounted above said chamber alined in parallel rows for reciprocation between said bars.

References Cited in the file of this patent

UNITED STATES PATENTS

| | | |
|---|---|---|
| 2,147,469 | Tallman | Feb. 14, 1939 |
| 2,362,861 | Russell | Nov. 14, 1944 |
| 2,450,082 | Crumb et al. | Sept. 28, 1948 |
| 2,458,713 | Linderer | Jan. 11, 1949 |
| 2,467,717 | Acton | Apr. 19, 1949 |
| 2,654,209 | Raney et al. | Oct. 6, 1953 |
| 2,695,489 | Lytle | Nov. 30, 1954 |
| 2,731,783 | Hauswirth | Jan. 24, 1956 |
| 2,757,602 | Nolt | Aug. 7, 1956 |

FOREIGN PATENTS

| | | |
|---|---|---|
| 153,042 | Australia | Sept. 1, 1953 |
| 1,066,294 | France | Jan. 20, 1954 |